US012692696B2

(12) United States Patent
Liu

(10) Patent No.: US 12,692,696 B2
(45) Date of Patent: Jul. 28, 2026

(54) HEAT INSULATION AND FIRE PREVENTION STRUCTURE

(71) Applicant: Industrial Hans Co. Ltd., Hk (HK)

(72) Inventor: Haihang Liu, Hk (HK)

(73) Assignee: Industrial Hans Co. Ltd., Hk (HK)

( * ) Notice: Subject to any disclaimer, the term of this patent is extended or adjusted under 35 U.S.C. 154(b) by 175 days.

(21) Appl. No.: 18/423,372

(22) Filed: Jan. 26, 2024

(65) Prior Publication Data

US 2024/0159047 A1 May 16, 2024

(30) Foreign Application Priority Data

Oct. 31, 2023 (CN) .......................... 202322926663.3

(51) Int. Cl.
*E04B 1/94* (2006.01)
*B32B 5/02* (2006.01)
*B32B 5/06* (2006.01)
*B32B 5/26* (2006.01)
*B32B 7/08* (2019.01)

(52) U.S. Cl.
CPC ................ *E04B 1/942* (2013.01); *B32B 5/02* (2013.01); *B32B 5/073* (2021.05); *B32B 5/26* (2013.01); *B32B 7/08* (2013.01); *B32B 2262/08* (2013.01); *B32B 2307/304* (2013.01); *B32B 2307/3065* (2013.01); *B32B 2307/7376* (2023.05); *B32B 2607/00* (2013.01)

(58) Field of Classification Search
CPC ....... B32B 2307/304; B32B 2307/3065; E04B 1/942; E04B 1/941; E04B 2/7411; F16B 25/0063; F16B 35/041; F16B 2200/99
See application file for complete search history.

(56) References Cited

U.S. PATENT DOCUMENTS 5,122,022 A * 6/1992 Kluser .................. E04D 3/3603
411/480
5,265,998 A * 11/1993 Kluser .................. E04B 1/7633
52/410

(Continued)

FOREIGN PATENT DOCUMENTS

CH 631776 A5 * 8/1982 ............ E04B 2/7411
DE 10147831 A1 * 9/2002 .............. E04B 1/78

(Continued)

*Primary Examiner* — Adriana Figueroa
(74) *Attorney, Agent, or Firm* — Hemisphere Law, PLLC

(57) ABSTRACT

The present invention discloses a heat insulation and fire prevention structure, which relates to the technical field of fire prevention structures of buildings. The heat insulation and fire prevention structure provided by the present invention comprises: a fireproof insulated wool and an external fire prevention board; the fireproof insulated wool is installed on a fire facing surface of a building structure to be fireproofed, and the external fire prevention board is installed on one side of the fire facing surface of the fireproof insulated wool; the fireproof insulated wool is formed by splicing a plurality of fireproof insulated wools and a sealing structure is arranged at a connection between the adjacent fireproof insulated wools. Air leakage at the connections can be effectively prevented through the sealing effect of the sealing structures, so as to strengthen the fire prevention and heat insulation effect.

9 Claims, 5 Drawing Sheets

(56)         References Cited

U.S. PATENT DOCUMENTS

| 2015/0201683 | A1 |   | 7/2015 | Maud |   |
|---|---|---|---|---|---|
| 2015/0300003 | A1 | * | 10/2015 | Jakobsen ................ | E04B 1/762 |
|   |   |   |   |   | 52/741.1 |
| 2018/0112812 | A1 |   | 4/2018 | Takahashi |   |
| 2018/0328254 | A1 |   | 11/2018 | Lehtonen et al. |   |

FOREIGN PATENT DOCUMENTS

| EP |   | 1235988 | B1 | * | 12/2005 | .......... | F16B 25/0057 |
|---|---|---|---|---|---|---|---|
| FR |   | 2872840 | A3 | * | 1/2006 | .............. | A62C 3/10 |
| GB |   | 2269605 | A | * | 2/1994 | ............. | E04B 1/942 |
| WO | WO-2016184476 | A1 | * | 11/2016 | | .......... | E04B 1/7616 |

* cited by examiner

HEAT INSULATION AND FIRE PREVENTION STRUCTURE

TECHNICAL FIELD

The present invention relates to the technical field of fire prevention structures of buildings, and more particularly relates to a heat insulation and fire prevention structure.

BACKGROUND

In modern buildings, fire prevention outside the wall is essential, and the fire resistance capability of steel structure walls is relatively poor. Therefore, fire prevention of steel structures is essential. The existing fire prevention methods for steel structures generally include the following: Firstly, the surface of the steel structure is coated with fireproof paint, which depends on the quality of the fireproof paint and the construction quality, so a fire prevention effect is not reliable. Secondly, a layer of fireproof board is wrapped on a surface layer of the steel structure, and the fire prevention effect also depends on the quality of the fireproof board. Thirdly, the steel structure is wrapped with concrete, which consumes more labor and takes a long time. Moreover, none of the above methods can achieve effective heat insulation, and the structural surface temperature rises quickly, which is easy to cause wall collapse and damage the safety of life and property. The addition of insulated wools in the steel structure can play a heat insulation effect, but due to the limitation of the sizes of the insulated wools, multiple insulated wools are needed. When multiple insulated wools are used, gaps will be generally produced at connections. When the fireproof board is burnt and damaged, the flame will penetrate through the gaps and come into direct contact with the building structure, which enhances the fire and causes rapid damage to the building structure.

Therefore, a technical problem to be urgently solved by those skilled in the art is how to provide a heat insulation and fire prevention structure with dual functions of heat insulation and fire prevention and good fire prevention effect.

SUMMARY

In view of this, the present invention aims to provide a heat insulation and fire prevention structure with good fire prevention effect.

In order to achieve the above purpose, the present invention adopts the following technical solution:

A heat insulation and fire prevention structure comprises: a fireproof insulated wool and an external fire prevention board; the fireproof insulated wool is installed on a fire facing surface of a building structure to be fireproofed, and the external fire prevention board is installed on the side of the fire facing surface of the fireproof insulated wool;

The fireproof insulated wool is formed by splicing a plurality of fireproof insulated wools and a sealing structure is arranged at a connection between the adjacent fireproof insulated wools.

The present invention can achieve the beneficial effects: the fire prevention board plays a role of fire prevention; and the fireproof insulated wool can effectively realize heat insulation to prevent the temperature of the building structure from rising too fast, which may result in structural damage, and can improve the overall fire prevention effect. Gaps will be generally produced at connections between the fireproof insulated wools. When the fire prevention board is burnt and damaged, the flame will penetrate through the gaps and come into direct contact with the building structure, which enhances the fire and causes rapid damage to the building structure. Air leakage at the connections can be effectively prevented through the sealing effect of the sealing structures, so as to strengthen the fire prevention and heat insulation effect.

Further, the structure further comprises an internal fire prevention board installed on an unexposed surface of the building structure.

Further, a thickness of each fireproof insulated wool is 12 mm.

Further, the fireproof insulated wools are fixed on the fire facing surface of the building structure through positioning screws; each positioning screw comprises a nut, a polished rod, a threaded rod and a positioning ring; the nut, the polished rod and the threaded rod are connected successively; the positioning ring is fixed on an outer side wall of the polished rod near one end of the threaded rod; the fireproof insulated wools can be clamped between the positioning ring and the nut; and a distance between the nut and the positioning ring is equal to the thickness of the fireproof insulated wool.

Further, a width of the positioning ring along a radial direction is 0.5 mm to 1 mm.

Further, butting splicing is formed between the fireproof insulated wools, the sealing structures are fireproof sealant filling layers, and the fireproof sealant filling layers are filled in seams.

Further, butting splicing is formed between the fireproof insulated wools; the sealing structures are heat insulation and wind blocking strips; a length direction of the heat insulation and wind blocking strips is arranged along a length direction of the seams, and the heat insulation and wind blocking strips are fixed on the corresponding seams near one side of the external fire prevention board; and both sides of the heat insulation and wind blocking strips centered on the seams along a width direction are abutted against the two adjacent fireproof insulated wools.

Further, distances between two side edges of the heat insulation and wind blocking strips along the width direction and the seams are not less than 50 mm.

Further, overlapping splicing is formed between the two adjacent fireproof insulated wools; overlapping parts are arranged at overlapping places; the overlapping parts are fixed at the seams near one side of the external fire prevention board; one end of the overlapping parts is integrally connected with one fireproof insulated wool; and the other end extends in a direction near the other fireproof insulated wool to overlap on the other fireproof insulated wool.

Further, a width of each overlapping part is not less than 30 mm.

According to the above technical solution, compared with the prior art, the present invention discloses and provides a heat insulation and fire prevention structure, which can play dual protection of fire prevention and heat insulation and effectively strengthen the fire prevention effect of the structure to be fireproofed. By arranging the sealing structures, the connections of the fireproof insulated wools can be sealed to avoid affecting the fire prevention effect due to air leakage at the connections.

DESCRIPTION OF DRAWINGS

To more clearly describe the technical solutions in embodiments of the present invention or in the prior art, the drawings required to be used in the description of the embodiments or the prior art will be simply presented below.

Apparently, the drawings in the following description are merely embodiments of the present invention, and for those ordinary skilled in the art, other drawings can also be obtained according to the provided drawings without contributing creative labor.

In the figures: 1, fireproof insulated wool; 2, external fire prevention board; 3, sealing structure; 31, fireproof sealant filling layer; 32, heat insulation and wind blocking strip; 33, overlapping part; 4, internal fire prevention board; 5, positioning screw; 51, nut; 52, polished rod; 53, threaded rod; 54, positioning ring; 6, building structure.

DETAILED DESCRIPTION

The technical solutions in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

In the present invention, unless otherwise specifically regulated and defined, terms such as "installation", "connected", "connecting", "fixation" and the like shall be understood in broad sense, and for example, may refer to fixed connection or detachable connection or integral connection, may refer to mechanical connection or electrical connection, and may refer to direct connection or indirect connection through an intermediate medium or inner communication of two elements or interaction relationship of two elements. For those ordinary skilled in the art, the specific meanings of the above terms in the present invention may be understood according to concrete conditions.

Embodiment 1

Figure 1:
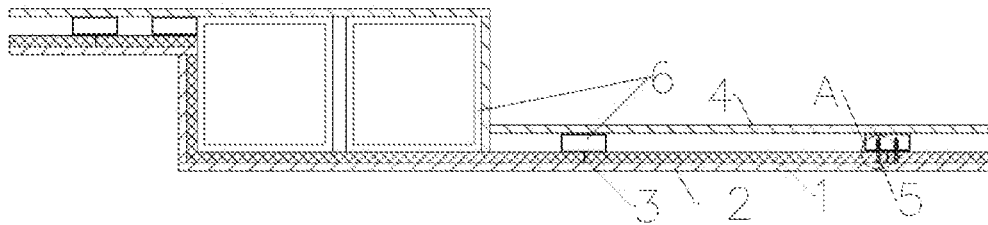
FIG. 1 is a structural schematic diagram of a heat insulation and fire prevention structure provided by embodiment 1 of the present invention.
Figure 5:
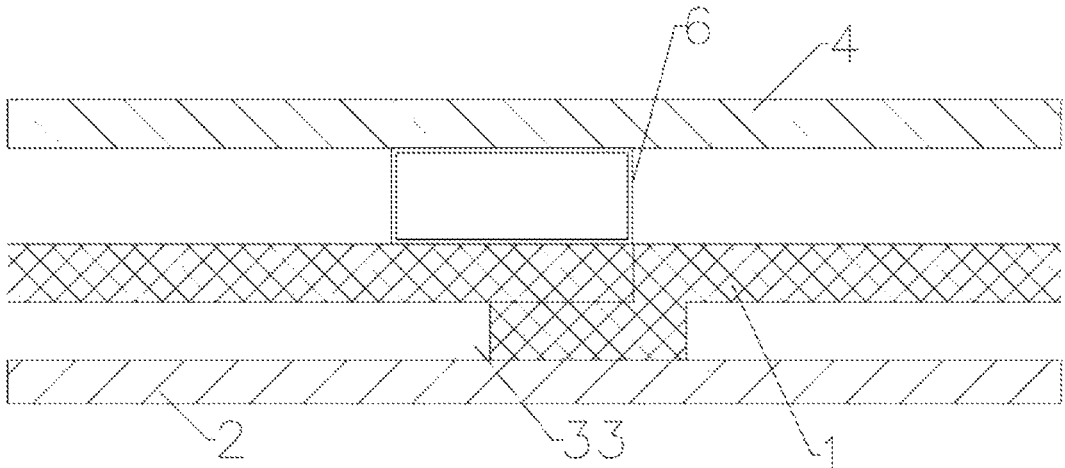
FIG. 5 is a structural schematic diagram of a heat insulation and fire prevention structure provided by embodiment 4 of the present invention.

By referring to FIG. 1 and FIG. 5, an embodiment of the present invention discloses a heat insulation and fire prevention structure, which comprises: a fireproof insulated wool 1 and an external fire prevention board 2; the fireproof insulated wool 1 is installed on a fire facing surface of a building structure 6 to be fireproofed, and the external fire prevention board 2 is installed on the side of the fire facing surface of the fireproof insulated wool 1. The fireproof insulated wool 1 is formed by splicing a plurality of fireproof insulated wools and a sealing structure 3 is arranged at a connection between the adjacent fireproof insulated wools.

The fire prevention board plays a role of fire prevention. The fireproof insulated wool 1 can effectively realize heat insulation to prevent the temperature of the building structure 6 from rising too fast, which may result in structural damage, and can improve the overall fire prevention effect. Gaps will be generally produced at connections between the fireproof insulated wools. When the fire prevention board is burnt and damaged, the flame will penetrate through the gaps and come into direct contact with the building structure 6, which enhances the fire and causes rapid damage to the building structure. Air leakage at the connections can be effectively prevented through the sealing effect of the sealing structures 3, so as to strengthen the fire prevention and heat insulation effect.

In practical use, the building structure 6 can be a structure such as an external wall body, a steel structure supporting frame and a structural column. When the building structure 6 is an overall structure with a large area such as the outer wall body, the fireproof insulated wool 1 and the external fire prevention board 2 are only required to be arranged successively on the fire facing surface of the wall body. When the building structure 6 is the steel structure supporting frame or the structural column, an internal fire prevention board 4 should also be arranged on one side of an unexposed surface. On the one hand, a role of structural sealing is achieved and aesthetics is enhanced. On the other hand, there is a gap between brackets of the supporting frame, so that there is an air channel between the fire facing surface and the unexposed surface, which is easy to aggravate the fire in the event of a fire disaster. Thus, a side of the unexposed surface is also provided with the internal fire prevention board 4, which prevents communication of the air channel inside the structure and outside air, facilitates strengthening of fire prevention performance of the building structure and improves a safety factor of the building structure.

Preferably, a thickness of each fireproof insulated wool is 12 mm. The fire prevention and heat insulation effect will be affected by the thickness of the fireproof insulated wools to a large extent. If the fireproof insulated wools have small thickness, the heat insulation effect is poor; and if the fireproof insulated wools have large thickness, the heat insulation effect is good, but consumables are large and the cost is high. Therefore, the fireproof insulated wools have thickness of 12 mm, and can effectively realize heat insulation and save cost.

Figure 2:
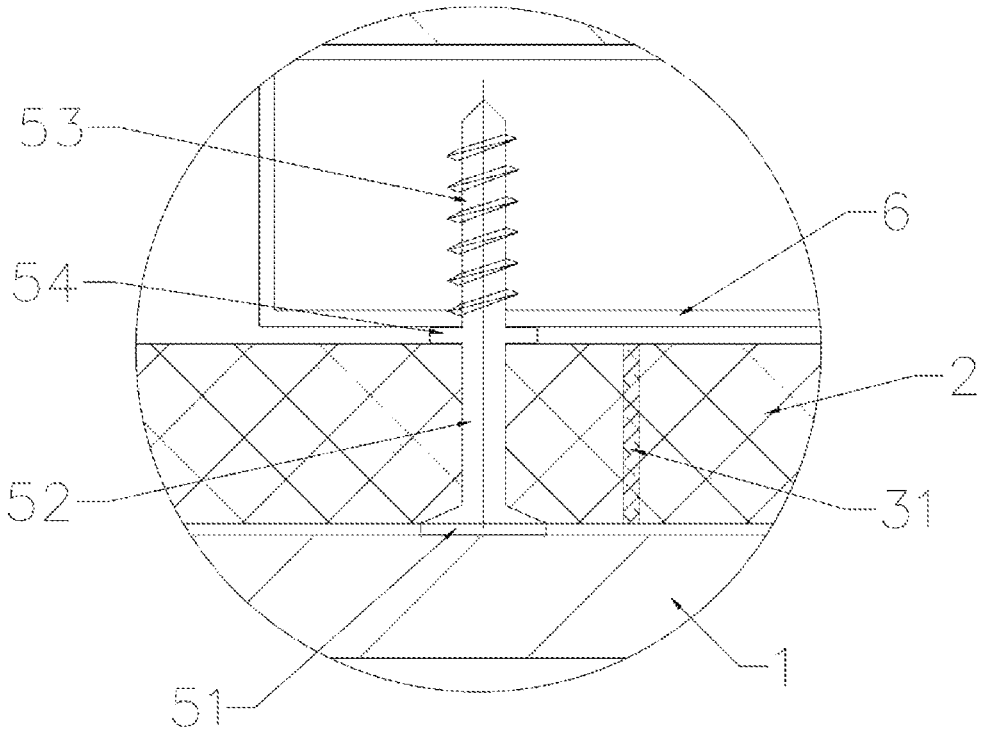
FIG. 2 is an enlarged structural schematic diagram of part A of FIG. 1.

As shown in FIG. 2, the fireproof insulated wools are fixed on the fire facing surface of the building structure 6 through positioning screws 5; each positioning screw 5 comprises a nut 51, a polished rod 52, a threaded rod 53 and a positioning ring 54; the nut 51, the polished rod 52 and the threaded rod 53 are connected successively; the positioning ring 54 is fixed on an outer side wall of the polished rod 52 near one end of the threaded rod 53; and the fireproof insulated wools can be clamped between the positioning ring 54 and the nut 51. A distance between the nut 51 and the positioning ring 54 is equal to the thickness of the fireproof insulated wool.

The material of the fireproof insulated wool is soft. When ordinary screws are used, if the screws are screwed in too long, the fireproof insulated wool is compacted, which affects the heat insulation effect. If the screws are screwed in too short, the fireproof insulated wool is not fixed firmly, resulting in air leakage at the connections, thereby reducing the heat insulation and fire prevention effect. The fireproof insulated wools have small density. As rotation is deepened, the positioning screw 5 can penetrate through pores of the fireproof insulated wools and is in threaded connection with the fire facing surface of the building structure 6. When the positioning ring 54 contacts the fire facing surface, screwing cannot be continued. At this time, the fireproof insulated wools are just clamped between the nut 51 and the positioning ring 54, which ensures the installation fastness while ensuring the heat insulation effect of the fireproof insulated wools. The positioning ring 54 can also play a leveling role to avoid affecting the heat insulation and fire prevention effect due to unevenness of the fireproof insulated wools caused by different screwing lengths of the positioning screw 5.

Preferably, a width of the positioning ring 54 along a radial direction is 0.5 mm to 1 mm, preferably 1 mm, which plays a positioning role while ensuring that the positioning ring can penetrate through the fireproof insulated wools.

Preferably, a diameter of the nut 51 is greater than a diameter of the polished rod 52 by at least 2 mm to prevent the fireproof insulated wools from getting out of one side of the nut 51. In some other embodiments, a washer may also be added between the nut 51 and the fireproof insulated wool.

In some other embodiments, the fireproof insulated wools can also be fixed to the fire facing surface of the building structure 6 by bonding.

Embodiment 2

Figure 3:
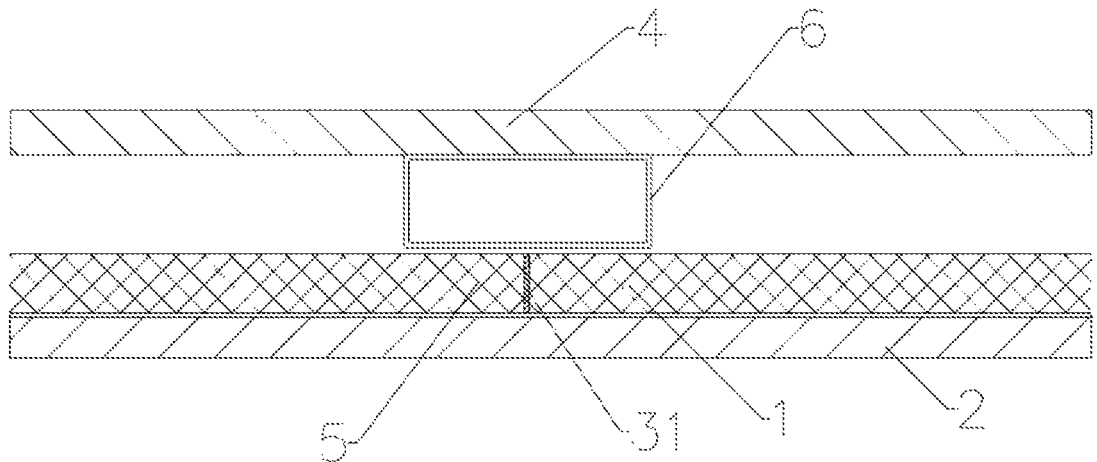
FIG. 3 is a structural schematic diagram of a heat insulation and fire prevention structure provided by embodiment 2 of the present invention.

By referring to FIG. 3, the present embodiment is improved on the basis of embodiment 1. Butting splicing is formed between the fireproof insulated wools. The sealing structures 3 are fireproof sealant filling layers 31, and the fireproof sealant filling layers 31 are filled in seams. A fireproof sealant not only fills the gaps, but also plays a role of bonding the fireproof insulated wools, and increases the firmness at connections while sealing.

Embodiment 3

Figure 4:
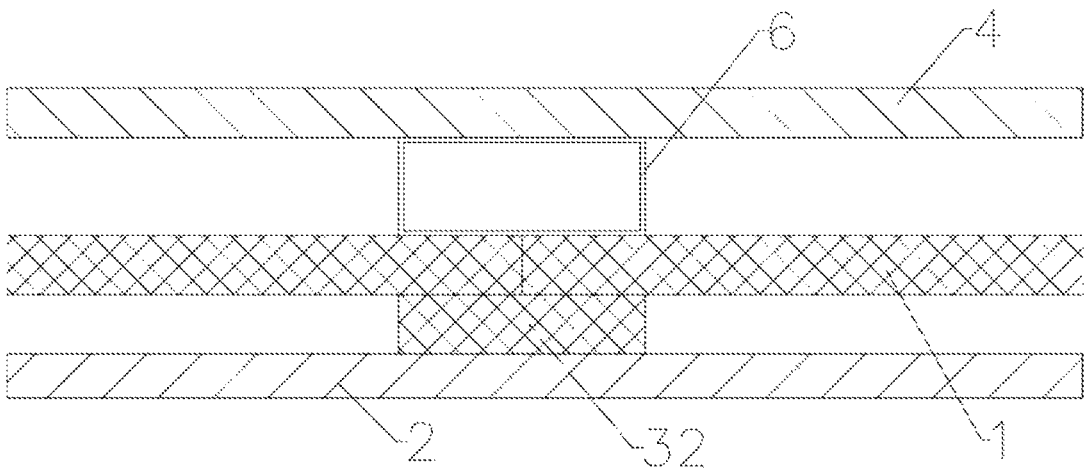
FIG. 4 is a structural schematic diagram of a heat insulation and fire prevention structure provided by embodiment 3 of the present invention.

By referring to FIG. 4, butting splicing is formed between the fireproof insulated wools; the sealing structures 3 are heat insulation and wind blocking strips 32; a length direction of the heat insulation and wind blocking strips 32 is arranged along a length direction of the seams, and the heat insulation and wind blocking strips are fixed on the corresponding seams near one side of the external fire prevention board 2; and both sides of the heat insulation and wind blocking strips 32 centered on the seams along a width direction are abutted against the two adjacent fireproof insulated wools. The heat insulation and wind blocking strips 32 and the fireproof insulated wools have the same material, and play the roles of sealing and heat insulation. The heat insulation and wind blocking strips 32 form an air cavity between the fireproof insulated wool 1 and the external fire prevention board 2, which further improves the heat preservation effect and the heat insulation effect of the fire prevention device. The fireproof insulated wools and the heat insulation and wind blocking strips 32 can be fixed to the building structure 6 by the positioning screws or bonding.

Preferably, distances between two side edges of the heat insulation and wind blocking strips 32 along the width direction and the seams are not less than 50 mm, which strengthens the sealing effect and prevents air leakage caused by untight sealing.

Embodiment 4

By referring to FIG. 5, overlapping splicing is formed between the fireproof insulated wools; overlapping parts 33 are arranged at overlapping places; the overlapping parts 33 are fixed at the seams near one side of the external fire prevention board 2; one end of the overlapping parts 33 is integrally connected with one fireproof insulated wool; and the other end extends in a direction near the other fireproof insulated wool to overlap on the other fireproof insulated wool. Leakage at junctions of the adjacent fireproof insulated wools is prevented, and the sealing effect is strengthened. The overlapping parts 33 form an air cavity between the fireproof insulated wool 1 and the external fire prevention board 2, which further improves the heat preservation effect and the heat insulation effect of the fire prevention device. The fireproof insulated wools and the overlapping parts 33 can be fixed to the building structure 6 by the positioning screws or bonding.

When the building structure to be fireproofed is a steel structure bracket, the other overlapped fireproof insulated wool extends to approach an edge of the steel structure bracket on one side of the fireproof insulated wool that is integrally connected with the overlapping parts, and fixed with the bracket by the positioning screws 5 to strengthen the firmness at connections. Preferably, the width of the overlapping parts 33 is not less than 30 mm.

Each embodiment in the description is described in a progressive way. The difference of each embodiment from each other is the focus of explanation. The same and similar parts among all of the embodiments can be referred to each other. For the device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications made to these embodiments will be apparent to those skilled in the art. General principles defined herein can be realized in other embodiments without departing from the spirit or scope of the present invention. Therefore, the present invention will not be limited to these embodiments shown herein, but will conform to the widest scope consistent with the principles and novel features disclosed herein.

What is claimed is:

1. A heat insulation and fire prevention structure, comprising: a fireproof insulated wool (1) and an external fire prevention board (2), wherein the fireproof insulated wool (1) is installed on a fire facing surface of a building structure (6) to be fireproofed, and the external fire prevention board (2) is installed on the side of the fire facing surface of the fireproof insulated wool (1);

the fireproof insulated wool (1) is formed by splicing a plurality of fireproof insulated wools and a sealing structure (3) is arranged at a seam between the adjacent fireproof insulated wools, wherein overlapping splicing is formed between two adjacent fireproof insulated wools of the plurality of insulated wools; overlapping parts (33) are arranged at overlapping places; the overlapping parts (33) are fixed at the seams near one side of the external fire prevention board (2); one end of the overlapping parts (33) is integrally connected with one fireproof insulated wool of the plurality of insulated wools; and the other end extends in a direction near the other fireproof insulated wool of the plurality of insulated wools to overlap on the other fireproof insulated wool, such that the overlapping parts form an air cavity between the fireproof insulated wool and the external prevention board.

2. The heat insulation and fire prevention structure according to claim 1, further comprising an internal fire prevention board (4) installed on an unexposed surface of the building structure (6).

3. The heat insulation and fire prevention structure according to claim 1, wherein a thickness of each fireproof insulated wool is 12 mm.

4. The heat insulation and fire prevention structure according to claim 1, wherein the fireproof insulated wools are fixed on the fire facing surface of the building structure (6) through positioning screws (5); each positioning screw (5) comprises a nut (51), a polished rod (52), a threaded rod (53) and a positioning ring (54); the nut (51), the polished rod (52) and the threaded rod (53) are connected successively; the positioning ring (54) is fixed on an outer side wall of the polished rod (52) near one end of the threaded rod (53); the fireproof insulated wools can be clamped between the positioning ring (54) and the nut (51); and a distance between the nut (51) and the positioning ring (54) is equal to the thickness of the fireproof insulated wool.

5. The heat insulation and fire prevention structure according to claim 4, wherein a width of the positioning ring along a radial direction is 0.5 mm to 1 mm.

6. The heat insulation and fire prevention structure according to claim 1, wherein butting splicing is formed between the fireproof insulated wools; the sealing structures (3) are fireproof sealant filling layers (31); and the fireproof sealant filling layers (31) are filled in the seams.

7. The heat insulation and fire prevention structure according to claim 1, wherein butting splicing is formed between the fireproof insulated wools; the sealing structures (3) are heat insulation and wind blocking strips (32); a length direction of the heat insulation and wind blocking strips (32) is arranged along a length direction of the seams, and the heat insulation and wind blocking strips are fixed on the corresponding seams near one side of the external fire prevention board (2); and both sides of the heat insulation and wind blocking strips (32) centered on the seams along a width direction are abutted against the two adjacent fireproof insulated wools.

8. The heat insulation and fire prevention structure according to claim 7, wherein distances between two side edges of the heat insulation and wind blocking strips (32) along the width direction and the seams are not less than 50 mm.

9. The heat insulation and fire prevention structure according to claim 1, wherein the width of the overlapping parts (33) is not less than 30 mm.

* * * * *